(12) United States Patent
Raghavan et al.

(10) Patent No.: US 10,442,180 B2
(45) Date of Patent: Oct. 15, 2019

(54) SYSTEMS AND METHODS FOR ADDITIVE MANUFACTURING RECOATING

(71) Applicant: General Electric Company, Schenectady, NY (US)

(72) Inventors: Kamala Chakravarthy Raghavan, Glenville, NY (US); Meisam Salahshoor Pirsoltan, Niskayuna, NY (US); Laura Cerully Dial, Clifton Park, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 15/595,178

(22) Filed: May 15, 2017

(65) Prior Publication Data
US 2018/0326712 A1    Nov. 15, 2018

(51) Int. Cl.
| | |
|---|---|
| *G06F 19/00* | (2018.01) |
| *B33Y 50/02* | (2015.01) |
| *B29C 64/153* | (2017.01) |
| *B29C 64/214* | (2017.01) |
| *B29C 64/393* | (2017.01) |
| *B33Y 10/00* | (2015.01) |
| *B29K 105/00* | (2006.01) |
| *B33Y 30/00* | (2015.01) |

(52) U.S. Cl.
CPC ............ *B33Y 50/02* (2014.12); *B29C 64/153* (2017.08); *B29C 64/214* (2017.08); *B29C 64/393* (2017.08); *B29K 2105/251* (2013.01); *B33Y 10/00* (2014.12); *B33Y 30/00* (2014.12)

(58) Field of Classification Search
CPC ......... B33Y 50/02; B33Y 30/00; B33Y 10/00; B29K 2105/251
See application file for complete search history.

(56) References Cited

U.S. PATENT DOCUMENTS

| | | |
|---|---|---|
| 5,902,537 A | 5/1999 | Almquist et al. |
| 2015/0165683 A1 | 6/2015 | Cheverton et al. |

(Continued)

FOREIGN PATENT DOCUMENTS

| | | |
|---|---|---|
| WO | 2015103476 A1 | 7/2015 |
| WO | 2016055386 A1 | 4/2016 |
| WO | 2016168172 A1 | 10/2016 |

*Primary Examiner* — Michael D Masinick
(74) *Attorney, Agent, or Firm* — Armstrong Teasdale LLP

(57) ABSTRACT

A control system for use in an additive manufacturing system. A recoating device is configured to distribute powder for forming a component and a recoating motor is configured to move at least one of the powder bed and the recoating device relative to each other. The control system includes at least one vibration sensor configured to collect vibration data, a torque sensor coupled to the recoating motor and configured to collect the torque output data, and an optical sensor configured to collect reflected light data. The control system includes a controller configured to receive the vibration data, receive the torque output data, and receive the reflected light data, the controller further configured to determine at least one powder bed characteristic based on at least one of the data, and control at least one recoating parameter of the recoating device based on the at least one determined powder bed characteristic.

23 Claims, 6 Drawing Sheets

(56) References Cited

U.S. PATENT DOCUMENTS

| | | | |
|---|---|---|---|
| 2015/0177158 A1* | 6/2015 | Cheverton | G01N 15/0227 |
| | | | 700/119 |
| 2017/0136704 A1* | 5/2017 | Giulietti | G05B 15/02 |
| 2017/0291372 A1* | 10/2017 | Milshtein | B33Y 10/00 |
| 2017/0304944 A1* | 10/2017 | Symeonidis | B23K 26/342 |
| 2018/0117845 A1* | 5/2018 | Buller | B29C 64/282 |
| 2018/0186067 A1* | 7/2018 | Buller | B29C 64/135 |
| 2018/0186080 A1* | 7/2018 | Milshtein | B29C 64/135 |
| 2018/0186081 A1* | 7/2018 | Milshtein | B29C 64/135 |
| 2018/0186082 A1* | 7/2018 | Randhawa | B29C 64/135 |
| 2018/0250744 A1* | 9/2018 | Symeonidis | B22F 3/1055 |

\* cited by examiner

SYSTEMS AND METHODS FOR ADDITIVE MANUFACTURING RECOATING

BACKGROUND

The subject matter disclosed herein relates generally to additive manufacturing systems and, more particularly, to methods and systems for recoating a component using a controller configured to receive data from a plurality of sensors and to change recoating parameters based on the received data.

At least some additive manufacturing systems involve the buildup of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS), and LaserCusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) A recoating device forms a build layer of particulate material, and the focused energy source device melts or consolidates the particulate material on the build platform in and around the area where the focused energy source is incident on the particulate material of the build layer, resulting in at least one melt pool or localized particulate material bonding. Each melt pool cools and forms at least a portion of the next layer of the component before the component is recoated with particulate in the build process.

In at least some DMLM systems, a recoat device is used to recoat the component with particulate material after each build layer is scanned by the laser beam. The typical recoat speeds for such systems per build layer is in the range of three to five inches per second. For certain parts, the total build time may take several days. In some instances, the time required to recoat a component per layer prevents significant cost benefits associated with additive manufacturing from being fully realized due to the significant portion of part build time that is required only for recoating. Additionally, the consistency of the particulate distribution in each build layer, which may include surface flatness and roughness, can influence the dimensional accuracy and material properties of the finished component.

BRIEF DESCRIPTION

In one aspect, a control system for use in an additive manufacturing system including a powder bed, a recoating device, and a recoating motor is provided. The recoating device is configured to distribute powder for forming a component and the recoating motor is configured to move at least one of the powder bed and the recoating device relative to each other. The control system includes at least two recoating sensors, the at least two recoating sensors including at least two of at least one vibration sensor configured to collect vibration data, a torque sensor coupled to the recoating motor and configured to collect torque output data, and an optical sensor configured to collect reflected light data. The control system includes a controller configured to receive data from the at least two recoating sensors, the data including at least two of the vibration data from the at least one vibration sensor, the torque output data from the torque sensor, and the reflected light data from the optical sensor. The controller is further configured to determine at least one powder bed characteristic based on at least one of the vibration data, the torque output data, and the reflected light data, and control at least one recoating parameter of the recoating device based on the at least one determined powder bed characteristic.

In another aspect, an additive manufacturing system is provided. The additive manufacturing system includes a platform including a powder bed and a recoating device coupled to the platform, the recoating device configured to distribute powder for forming a build layer in the powder bed. The additive manufacturing system also includes a recoating motor coupled to the platform and configured to move at least one of the powder bed and the recoating device relative to each other. The additive manufacturing system further includes a control system. The control system includes at least two recoating sensors, the at least two recoating sensors including at least two of at least one vibration sensor configured to collect vibration data, a torque sensor coupled to the recoating motor and configured to collect torque output data, and an optical sensor configured to collect reflected light data. The control system includes a controller configured to receive data from the at least two recoating sensors, the data including at least two of the vibration data from the at least one vibration sensor, the torque output data from the torque sensor, and the reflected light data from the optical sensor. The controller is further configured to determine at least one powder bed characteristic based on at least one of the vibration data, the torque output data, and the reflected light data, and control at least one recoating parameter of the recoating device based on the at least one determined powder bed characteristic.

In yet another aspect, a method for recoating a component in a powder bed is provided. The method includes moving at least one of the powder bed and a recoating device relative to each other to form a build layer, and collecting data using at least two recoating sensors, collecting the data including at least two of collecting vibration data using at least one vibration sensor, collecting torque output data using a torque sensor mounted to a recoating motor, and collecting reflected light data using an optical sensor. The method further includes receiving, by a controller, the data from the at least two recoating sensors the data including at least two of the vibration data from the at least one vibration sensor, the torque output data from the at least one torque sensor, and the reflected light data from the optical sensor. The method includes determining, by the controller, at least one powder bed characteristic based on at least one of the vibration data, the torque output data, and the reflected light data. The method also includes controlling, by the controller, movement of the recoating device based on the at least one determined powder bed characteristic.

DRAWINGS

These and other features, aspects, and advantages of the present disclosure will become better understood when the following detailed description is read with reference to the accompanying drawings in which like characters represent like parts throughout the drawings, wherein.

Figure 1:
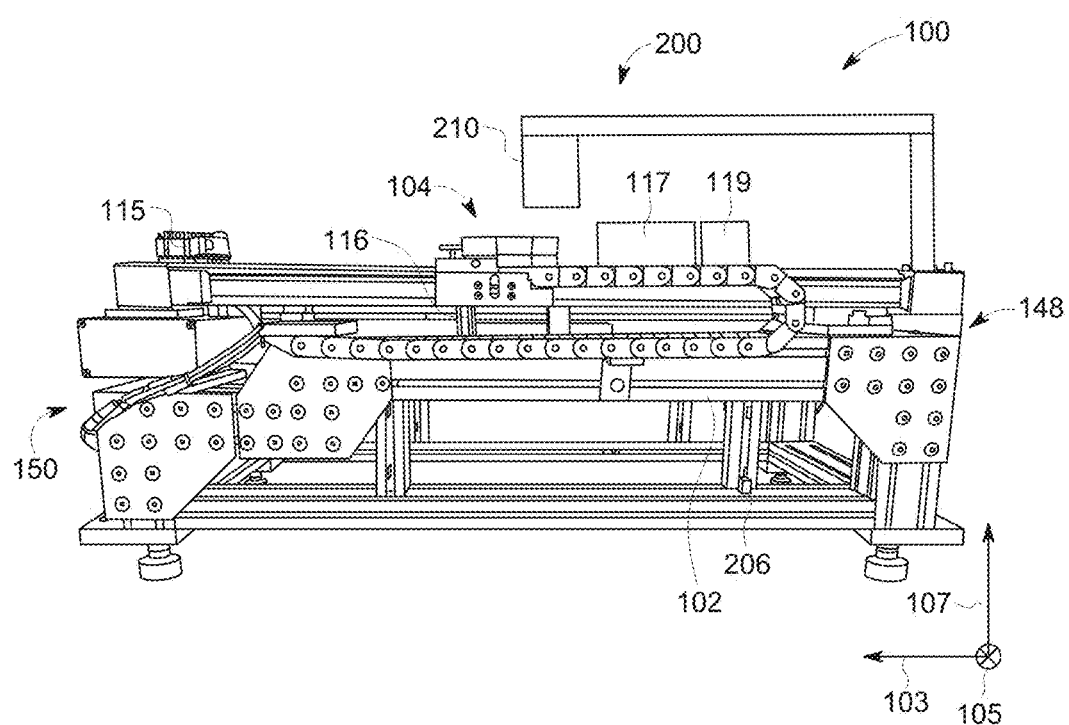
FIG. 1 is a perspective schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The methods and systems described herein provide improved recoating of components in an additive manufacturing system through monitoring and controlling of the recoating process. Specifically, a recoating controller and a plurality of sensors facilitate reducing variation in the particulate distribution within a build layer of a powder bed. The controller receives real-time vibration data and visual imaging data from a plurality of sensors and modifies a plurality of recoating parameters to facilitate reducing variation in the particulate distribution within a build layer of the powder bed. The improved particulate distribution within a build layer facilitates improving consistency in component material and structural properties and leads to decreased scrap rates and recoating times. As a result, the system facilitates improved monitoring and operation of the recoating operation and provides real-time data relating to the recoating process during operation.

Figure 2:
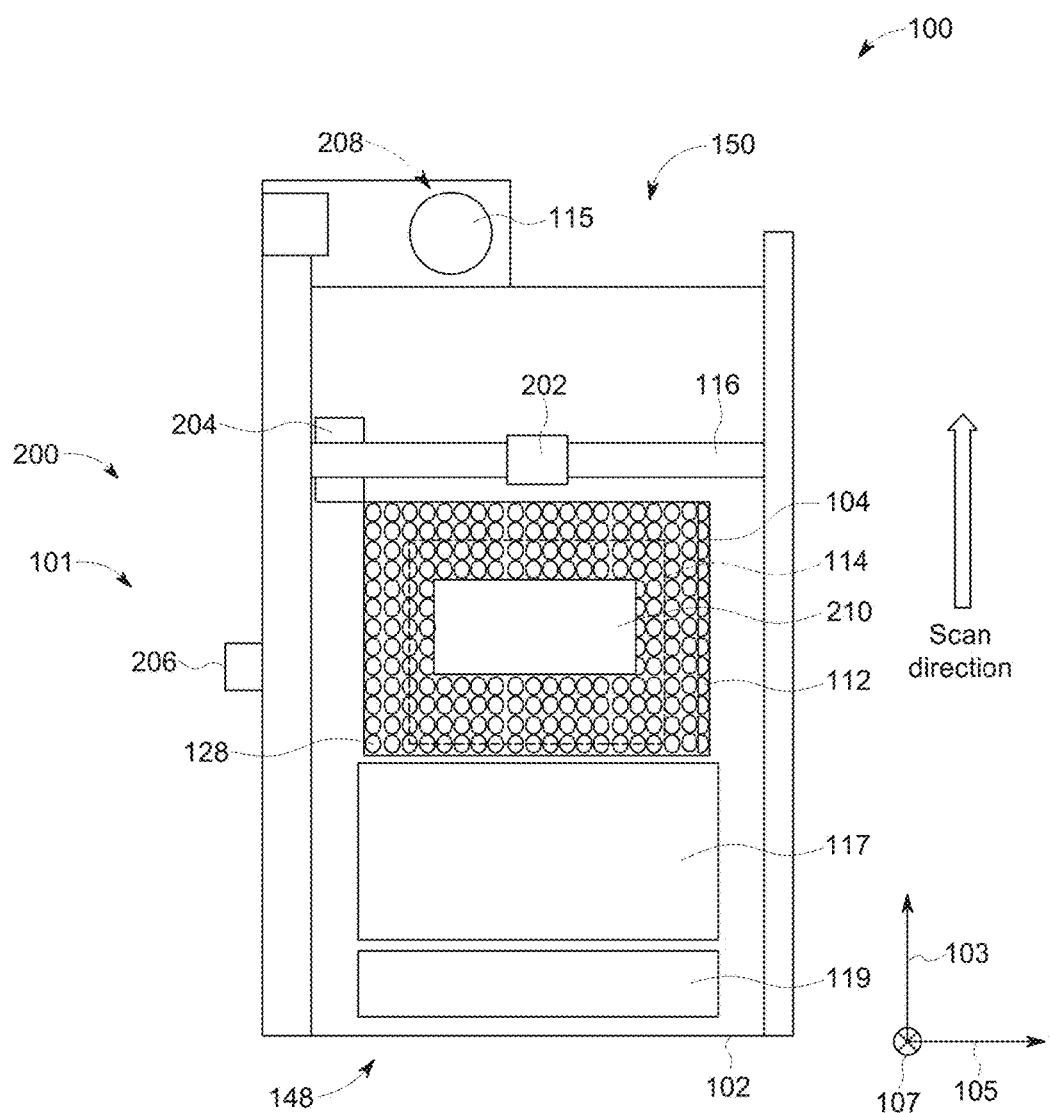
FIG. 2 is a schematic view of the additive manufacturing system shown in FIG. 1 including an exemplary scanning system and an exemplary recoating system, viewed from above a powder bed.

FIG. 1 is a perspective view of an exemplary additive manufacturing system 100. FIG. 2 is a schematic view of additive manufacturing system 100 shown in FIG. 1 including an exemplary scanning system 101 and an exemplary control system 200, viewed from above a powder bed 104. In the exemplary embodiment, additive manufacturing system 100 is a direct metal laser melting (DMLM) system. In alternative embodiments, additive manufacturing system 100 is configured for use in any additive manufacturing process that facilitates operation of additive manufacturing system 100 as described herein. For example, in some embodiments, additive manufacturing system 100 is used for any of the following processes: Selective Laser Sintering (SLS), Direct Metal Laser Sintering (DMLS), Selective Laser Melting (SLM), and LaserCusing®. (LaserCusing is a registered trademark of Concept Laser GmbH of Lichtenfels, Germany.) In the exemplary embodiment, additive manufacturing system 100 includes a build platform 102, powder bed 104, a scanning system 101 (shown in FIG. 3), a build layer 112, a component 114, a control system 200, a recoating motor 115, a recoating device 116, a first housing 117, and a second housing 119, each housing 117 and 119 containing components of additive manufacturing system 100. Control system 200 includes a first vibration sensor 202, a second vibration sensor 204, a third vibration sensor 206, a torque sensor 208, and an optical sensor 210. A longitudinal axis 103 of additive manufacturing system 100 extends through additive manufacturing system 100 in the direction of travel of recoating device 116. A transverse axis 105 extends in a plane substantially parallel to build platform 102 and normal to longitudinal axis 103. A vertical axis 107 extends in a direction that is normal to longitudinal axis 103 and normal to transverse axis 105. Longitudinal axis 103, transverse axis 105, and vertical axis 107 are orthogonal to each other.

Figure 3:
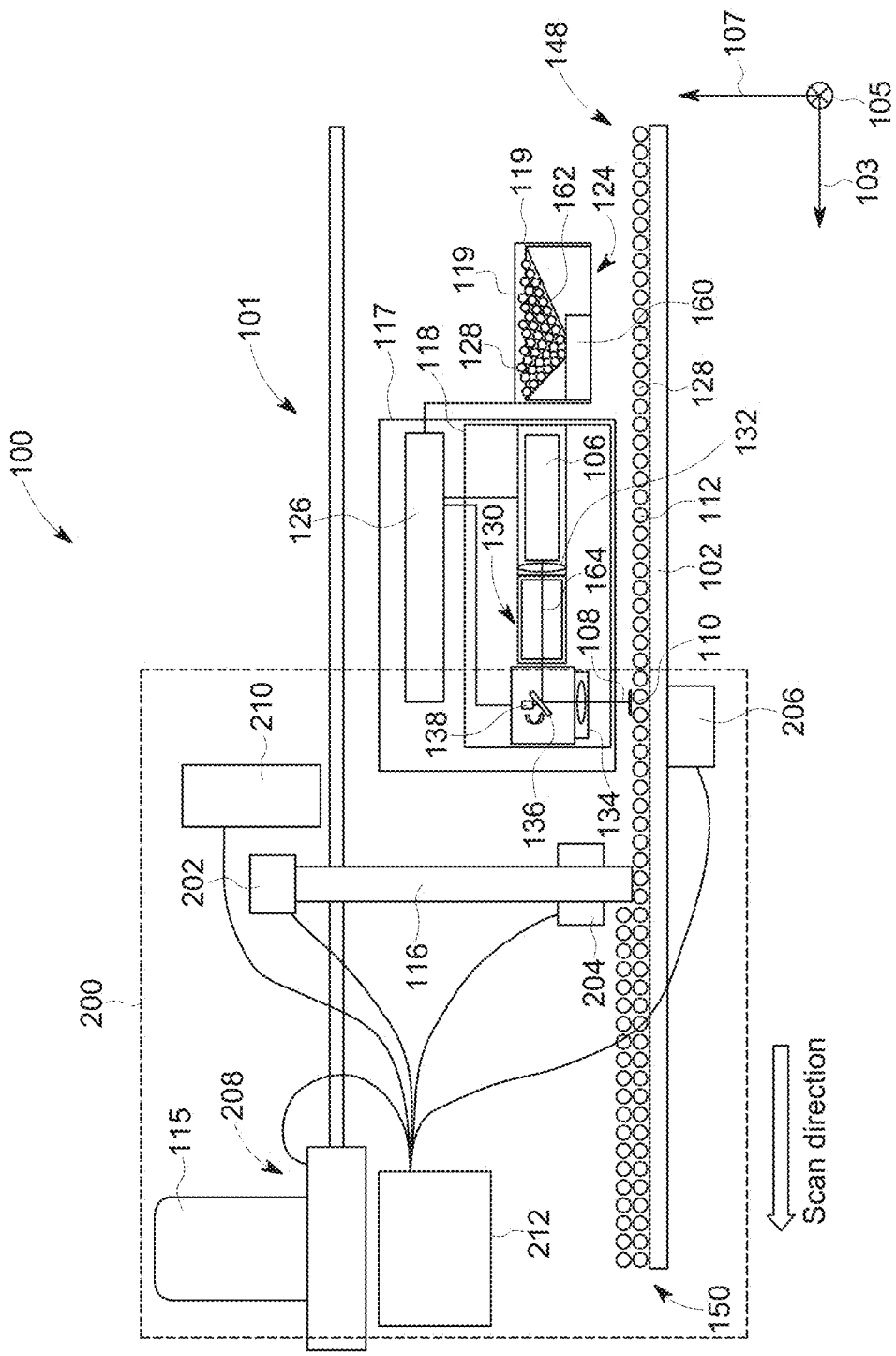
FIG. 3 is a schematic side view of the additive manufacturing system shown in FIG. 1, illustrating the scanning system and the recoating system shown in FIG. 2.

FIG. 3 is a schematic side view of additive manufacturing system 100 shown in FIG. 1, illustrating scanning system 101 and control system 200 shown in FIG. 2. In the exemplary embodiment, additive manufacturing system 100 includes scanning system 101 including an energy beam 108, at least one melt pool 110, control system 200, and a particulate delivery system 124. Scanning system 101 includes first housing 117, a focused energy source 106, a plurality of optical elements 130, a powder melting device 118, and a controller 126. Particulate delivery system 124 includes a second housing 119. In alternative embodiments, additive manufacturing system 100 includes any component in any quantity that facilitates operation of additive manufacturing system 100 as described herein. Additionally, in the exemplary embodiment, build platform 102 defines powder bed 104, and powder bed 104 is configured to hold a plurality of particulates 128. In alternative embodiments, powder bed 104 is configured to have an atmosphere of argon. However, powder bed 104 may have an atmosphere of any inert gas which enables manufacturing system 100 to operate as described herein.

In the exemplary embodiment, first housing 117 houses powder melting device 118, including optical elements 130 and controller 126, as part of scanning system 101. Controller 126 is coupled to particulate delivery system 124 and energy source 106. Controller 126 may be any type of controller configured to output a control signal to control operation of additive scanning system 101 and particulate delivery system 124. Controller 126 executes operations to control the operation of at least a portion of scanning system 101 based at least partially on instructions from human operators. Controller 126 may use, for example, a 3D model of component 114 to be fabricated by scanning system 101. Operations executed by controller 126 include controlling power output of energy source 106 and controlling a scanning speed of powder melting device 118.

Also in the exemplary embodiment, second housing 119 provides a controlled environment housing components of additive manufacturing system 100 such as particulate delivery system 124. Particulate delivery system 124 includes a dispenser 160 and a particulate supply 162. At least a portion of particulate delivery system 124 is enclosed within housing 119. In particular, dispenser 160 and particulate supply 162 are positioned within the controlled environment of housing 119 to inhibit exposure of particulates 128 to the ambient environment. In alternative embodiments, particulate delivery system 124 is positioned anywhere in additive manufacturing system 100 that facilitates additive manufacturing system 100 operating as described herein. Further, in alternative embodiments, particulate delivery system 124 includes any housing 119 that facilitates additive manufacturing system 100 operating as described herein.

In addition, in the exemplary embodiment, particulates 128 are powdered build materials that are melted and re-solidified during the additive manufacturing process to build a solid component. In the exemplary embodiment, particulates 128 include an alloy of any of the following: cobalt, iron, aluminum, titanium, nickel, and combinations thereof. In alternative embodiments, particulates 128 include any material that facilitates the operation of additive manufacturing system 100 as described herein. For example, in some embodiments, particulates 128 include, without limitation, any of the following: ceramic powders, metal-coated ceramic powders, thermoset resins, and thermoplastic resins. In further embodiments, additive manufacturing system 100 utilizes any number of different particulates.

In the exemplary embodiment, dispenser 160 is positioned above powder bed 104 to deposit particulates 128 onto powder bed 104. In particular, dispenser 160 is coupled to particulate supply 162 and configured to dispense particulates 128 from particulate supply 162 onto powder bed 104. In alternative embodiments, particulate delivery system 124 includes any dispenser that facilitates the operation of additive manufacturing system 100 as described herein. For example, in some embodiments, particulate delivery system 124 includes a transfer mechanism to deposit particulates 128 onto a surface of powder bed 104.

At least a portion of particulate delivery system 124 is configured to move relative to powder bed 104. In particular, particulate dispenser 160 is configured to move parallel to longitudinal axis 103 and transverse axis 105. Accordingly, particulate delivery system 124 is configured to deposit at least particulates 128 in any suitable pattern on powder bed 104.

Also, in the exemplary embodiment, at least a part of control system 200 is configured to displace particulates 128 when particulates 128 are on powder bed 104. Recoating device 116 is configured to distribute particulates 128 for forming component 114 in powder bed 104, and recoating motor 115 is configured to move at least one of powder bed 104 and recoating device 116 relative to each other. For example, in some embodiments, recoating device 116 includes a tool configured to contact particulates 128 and thereby displace contacted particulates 128. In the exemplary embodiment, recoating device 116 is configured to move relative to powder bed 104 and displaces particulates 128 to form desired shapes, such as recesses, in particulates 128 in order to form build layer 112 to fabricate component 114. In another embodiment, recoating device 116 is moveable relative to vertical axis 107 and stationary relative to longitudinal axis 103 and transverse axis 105, and powder bed 104 is moved relative to recoating device 116. In yet another embodiment, recoating device 116 is coupled to housing 117 and housing 119, and is configured to move along with housing 117 and housing 119 relative to powder bed 104.

In the exemplary embodiment, control system 200 includes first vibration sensor 202 and second vibration sensor 204. First vibration sensor 202 is coupled to an upper portion of recoating device 116 and second vibration sensor 204 is coupled to a lower portion of recoating device 116. Each of first vibration sensor 202 and second vibration sensor 204 is configured to collect vibration data during the recoating process. Third vibration sensor 206 is coupled to build platform 102 and is configured to collect vibration data transmitted through build platform 102 during the recoating process. In the exemplary embodiment, first vibration sensor 202 is a single-axis accelerometer and is configured to collect vibration data along vertical axis 107. Also in the exemplary embodiment, each of second vibration sensor 204 and third vibration sensor 206 is a triple-axis accelerometer configured to collect vibration data along each of longitudinal axis 103, transverse axis 105, and vertical axis 107. In alternative embodiments, control system 200 includes any type and number of vibration sensors as facilitate the operation of control system 200 as described herein.

Also, in the exemplary embodiment, control system 200 includes a torque sensor 208. Torque sensor 208 is coupled to the output shaft of recoating motor 115 and is configured to record the torque output of recoating motor 115 during operation of recoating device 116. Control system 200 also includes optical sensor 210 positioned above powder bed 104. Optical sensor 210 receives light reflected from powder bed 104 and generates a three dimensional image of build layer 112 using the reflected light after each cycle of recoating device 116. In other embodiments, optical sensor 210 generates a line profile measurement. In alternative embodiments, control system 200 includes any type and number of optical sensors to facilitate the operation of control system 200 as described herein.

In the exemplary embodiment, optical sensor 210 is configured to receive light reflected from build layer 112 that has been formed from particulates 128 after at least one cycle by recoating device 116. In the exemplary embodiment, optical sensor 210 is a 3-D imaging profilometer communicatively coupled to system controller 212. In the exemplary embodiment, optical sensor 210 operates as an optical interference microscope. In the exemplary embodiment, a light beam from optical sensor 210 is split and reflected off of the surface of build layer 112 and a reference surface. The light received back from build layer 112 is recombined with the light reflected off the reference surface and the resulting destructive and constructive interference in the combined beam indicates height variances in build layer 112. The height difference is calculated across a surface using the known wavelength of the beam to yield a 3-D representation of the surface of build layer 112. In another embodiment, optical sensor 210 operates as a spot optical displacement sensor that is configured to monitor relative movement between parts of additive manufacturing system 100 during the recoating process. In alternative embodiments, control system 200 includes any type of optical sensor 210, including a structured light-based sensor, that facilitates additive manufacturing system 100 operating as described herein.

Figure 4:
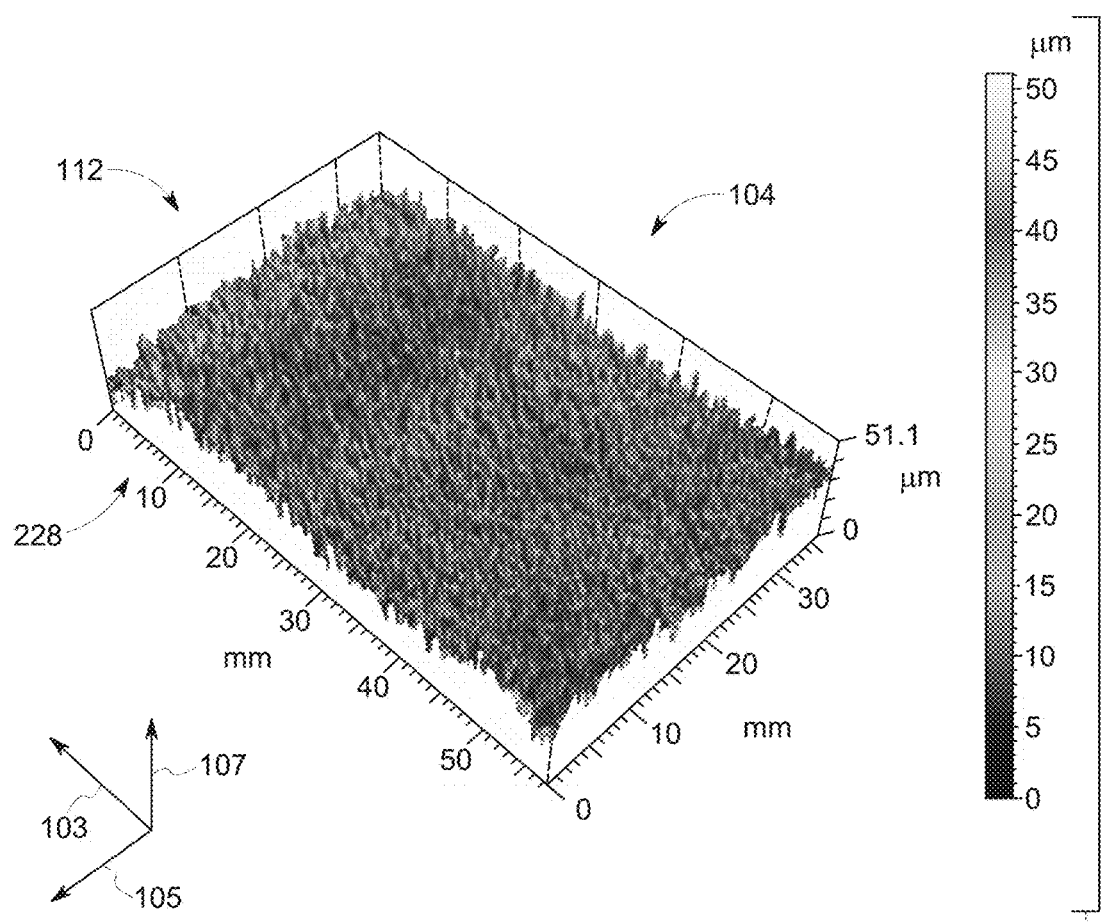
FIG. 4 is a three-dimensional (3-D) representation of optical powder bed surface data that is generated by the recoating system shown in FIGS. 2-3.

FIG. 4 is a 3-D representation of exemplary optical powder bed surface data 228 generated by optical sensor 210 (shown in FIGS. 2 and 3). In the exemplary embodiment, a plurality of surface data 228 includes a three-dimensional representation of a surface condition of build layer 112 of powder bed 104. Light reflected from powder bed 104 and incident on optical sensor 210 is analyzed to determine a position of each particulate 128 relative to optical sensor 210 in a vertical dimension parallel to vertical axis 107. Thus, optical sensor 210 facilitates determination of surface conditions present within each build layer 112. For example, but not by way of limitation, the received light can be used to determine a surface roughness and a flatness of build layer 112. In alternative embodiments, optical sensor 210 is configured to receive and analyze reflected light in any way that facilitates the operation of additive manufacturing system 100 as described herein.

Figure 5:
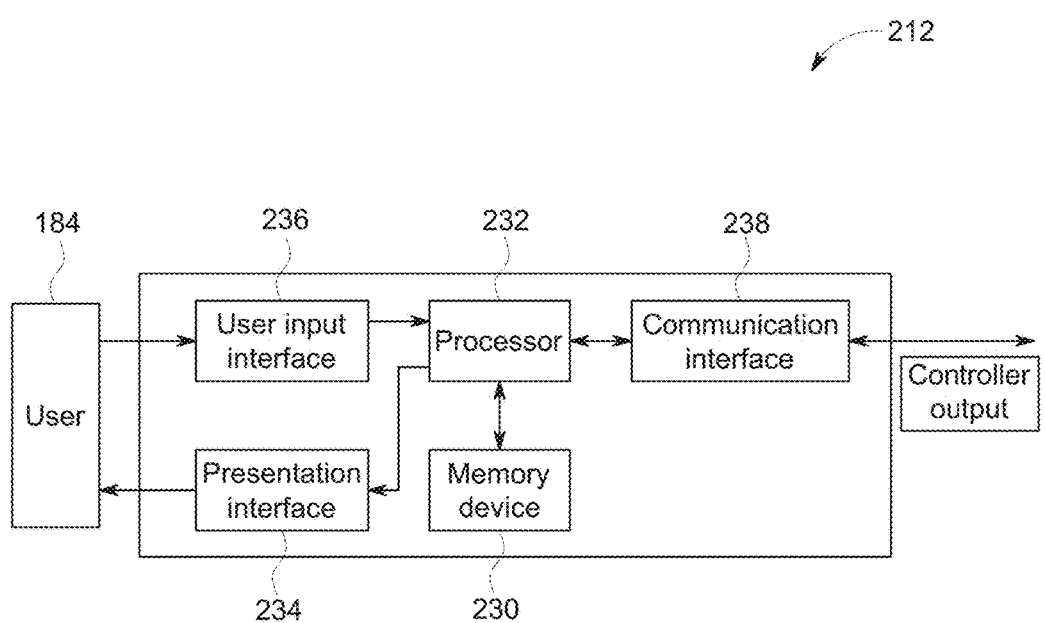
FIG. 5 is a block diagram of a controller that is used to operate the recoating system shown in FIGS. 2-3.

FIG. 5 is a block diagram of a system controller 212 that may be used to operate control system 200 (shown in FIGS. 2 and 3). In the exemplary embodiment, as shown in FIG. 3 and FIG. 5, system controller 212 is coupled to torque sensor 208, optical sensor 210, first vibration sensor 202, second vibration sensor 204, third vibration sensor 206, and controller 126. System controller 212 may be any type of controller configured to output a control signal to control operation of control system 200. System controller 212 executes operations to control the operation of control system 200 based at least partially on input from human operators. System controller 212 uses, for example, 3-D models of each build layer 112 of component 114 to be assembled from particulates 128. Operations executed by system controller 212 include controlling a power output and cycle time of recoating motor 115, receiving vibration data from each of first vibration sensor 202, second vibration sensor 204, and third vibration sensor 206, receiving torque output data from torque sensor 208, and receiving reflected light data from optical sensor 210.

In the exemplary embodiment, system controller 212 includes a memory device 230 and a processor 232 coupled to memory device 230. Processor 232 may include one or more processing units, such as, without limitation, a multi-core configuration. Processor 232 is any type of processor that permits system controller 212 to operate as described herein. In some embodiments, executable instructions are stored in memory device 230. System controller 212 is configurable to perform one or more operations described herein by programming processor 232. For example, processor 232 may be programmed by encoding an operation as one or more executable instructions and providing the executable instructions in memory device 230. In the exemplary embodiment, memory device 230 is one or more devices that enable storage and retrieval of information such as executable instructions or other data. Memory device 230 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 230 may be configured to store any type of data, including, without limitation, a plurality of build parameters associated with component 114. In some embodiments, processor 232 removes or "purges" data from memory device 230 based on the age of the data. For example, processor 232 may overwrite previously recorded and stored data associated with a subsequent time or event. In addition, or alternatively, processor 232 may remove data that exceeds a predetermined time interval. In addition, memory device 230 includes, without limitation, sufficient data, algorithms, and commands to facilitate monitoring of build parameters and the geometric conditions of each build layer 112 of component 114.

In the exemplary embodiment, system controller 212 includes a presentation interface 234 coupled to processor 232. Presentation interface 234 presents information, such as the operating conditions of control system 200, to a user 184. In one embodiment, presentation interface 234 includes a display adapter (not shown) coupled to a display device (not shown), such as a cathode ray tube (CRT), a liquid crystal display (LCD), an organic LED (OLED) display, or an "electronic ink" display. In some embodiments, presentation interface 234 includes one or more display devices. In addition, or alternatively, presentation interface 234 includes an audio output device (not shown), for example, without limitation, an audio adapter or a speaker (not shown).

In the exemplary embodiment, system controller 212 includes a user input interface 236 coupled to processor 232 and memory device 230 and that receives input from user 184. User input interface 236 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 234 and user input interface 236.

In the exemplary embodiment, a communication interface 238 is coupled to processor 232 and is configured to be coupled in communication with one or more other devices, such as recoating motor 115 and torque sensor 208 and to perform input and output operations with respect to such devices while performing as an input channel. For example, communication interface 238 may include, without limitation, a wired network adapter, a wireless network adapter, a mobile telecommunications adapter, a serial communication adapter, and/or a parallel communication adapter. Communication interface 238 may receive a data signal from or transmit a data signal to one or more remote devices. For example, in some embodiments, communication interface 238 may transmit/receive data signals to/from recoating motor 115.

Presentation interface 234 and communication interface 238 are both capable of providing information suitable for use with the methods described herein, such as, providing information to user 184 or processor 232. Accordingly, presentation interface 234 and communication interface 238 may be referred to as output devices. Similarly, user input interface 236 and communication interface 238 are capable of receiving information suitable for use with the methods described herein and may be referred to as input devices.

In reference to FIGS. 1-3, in the exemplary embodiment, energy source 106 is configured to heat particulates 128. Energy source 106 is optically coupled to optical elements 130 and powder melting device 118. Optical elements 130 and powder melting device 118 are configured to facilitate controlling the scanning of energy source 106. In the exemplary embodiment, energy source 106 is a laser device such as a yttrium-based solid state laser configured to emit a laser beam 164 having a wavelength of about 1070 nanometers (nm). In alternative embodiments, scanning system 101 includes any energy source 106 that facilitates operation of additive manufacturing system 100 as described herein. For example, in some embodiments, scanning system 101 includes a first energy source having a first power and a second energy source having a second power different from the first power. In further embodiments, scanning system 100 includes at least two energy sources having substantially the same power output. In further embodiments, scanning system 101 includes at least one energy source that is an electron beam generator. In some embodiments, scanning system 101 includes a diode fiber laser array (not shown) including a plurality of diode lasers and a plurality of optical fibers. In such embodiments, the diode fiber array simultaneously directs laser beams from optical fibers towards powder bed 104 to heat particulates 128.

Moreover, in the exemplary embodiment, optical elements 130 facilitate focusing beam 164 on powder bed 104. In the exemplary embodiment, optical elements 130 include a beam collimator 132 disposed between energy source 106 and powder melting device 118, and at least one lens 134 disposed between powder melting device 118 and powder bed 104. In alternative embodiments, scanning system 101 includes any optical element that facilitates operation of additive manufacturing system 100 as described herein.

During operation, in the exemplary embodiment, powder melting device 118 is configured to direct beam 164 across selective portions of powder bed 104 to create a solid component 114. In the exemplary embodiment, powder melting device 118 is a galvanometer scanning device including a mirror 136 operatively coupled to a galvanometer-controlled motor 138 (broadly, an actuator). Motor 138 is configured to move (specifically, rotate) mirror 136 in response to signals received from controller 126, and thereby deflect beam 164 towards and across selective portions of powder bed 104. In some embodiments, mirror 136 includes a reflective coating that has a reflectance spectrum that corresponds to the wavelength of beam 164. In alternative embodiments, scanning system 101 includes any scanning device that facilitates operation of additive manufacturing system 100 as described herein. For example, in some embodiments, powder melting device 118 includes two mirrors and two galvanometer-controlled motors, each motor operatively coupled to one of the mirrors. In further embodiments, powder melting device 118 includes, without limitation, any of the following: two-dimensional (2-D) scan galvanometers, 3-D scan galvanometers, and dynamic focusing galvanometers.

Scanning system 101 is operated to fabricate component 114 using a layer-by-layer manufacturing process. Component 114 is fabricated from an electronic representation of the 3-D geometry of the component 114. In some embodiments, the electronic representation is produced as a computer aided design (CAD) file or similar file. In alternative embodiments, the electronic representation is any electronic representation that facilitates operation of scanning system 101 as described herein. In the exemplary embodiment, the CAD file of component 114 is converted into a layer-by-layer format that includes a plurality of build parameters for each build layer 112. In the exemplary embodiment, component 114 is modeled in a desired orientation relative to the origin of the coordinate system used in additive manufacturing system 100. The geometry of component 114 is sliced into a stack of build layers 112 of a desired thickness, each build layer 112 including a plurality of particulates 128, such that the geometry of each build layer 112 is an outline of the cross-section through component 114 at that particular build layer 112 location. A "toolpath" or "toolpaths" are generated across the geometry of a respective build layer 112. The build parameters are applied along the toolpath or toolpaths to fabricate that build layer 112 of component 114 from the material used to construct component 114. These steps are repeated for each respective build layer 112. Once the process is completed, an electronic computer build file (or files) is generated including all of build layers 112. The build file is loaded into controller 126 of scanning system 101 to control the system during fabrication of each build layer 112.

With reference to scanning system 101, "parameters" refers to characteristics that are used to define operating conditions of scanning system 101, such as a power output of energy source 106, a vector scanning speed of energy source 106, a raster power output of energy source 106, a raster scanning speed of energy source 106, a raster tool path of energy source 106, and a contour power output of energy source 106 within additive manufacturing system 100. In some embodiments, the parameters are initially input by a user into controller 126. The parameters represent a given operating state of scanning system 101. In general, during raster scanning, beam 164 is scanned sequentially along a series of substantially straight lines spaced apart and parallel to each other. During vector scanning, beam 164 is generally scanned sequentially along a series of substantially straight lines or vectors, where the orientation of the vectors relative to each other sometimes varies. In general, the ending point of one vector coincides with the beginning point of the next vector. Vector scanning is generally used to define the outer contours of component 114, whereas raster scanning is generally used to "fill" the spaces enclosed by the contour, where component 114 is solid.

After the build file is loaded into controller 126, scanning system 101 generates component 114 by implementing the layer-by-layer manufacturing process, such as a DMLM method. The exemplary layer-by-layer additive manufacturing process does not use a pre-existing article as the precursor to final component 114, rather the process produces component 114 from a raw material in a configurable form, such as particulates 128. For example, without limitation, a steel component may be additively manufactured using a steel powder. Scanning system 101 facilitates fabrication of components 114 using a broad range of materials, for example, without limitation, metals, ceramics, and polymers. In alternative embodiments, DMLM fabricates components 114 from any materials that facilitate operation of additive manufacturing system 100 as described herein.

During operation, in the exemplary embodiment, control system 200 is configured to recoat component 114 with particulates 128 to facilitate scanning system 101 fabricating component 114 in a layer-by-layer manufacturing process. In the exemplary embodiment, system controller 212 is configured to move recoating device 116 relative to powder bed 104. In particular, recoating device 116 is configured to move longitudinally relative to powder bed 104 in response to inputs from recoating device motor 115. In the exemplary embodiment, a complete cycle of recoating device is defined by recoating device 116 moving longitudinally over powder bed 104 from a position proximate a platform first end 148 to a position proximate a platform second end 150 and returning to the original position proximate platform first end 148. In addition, recoating device 116 is configured to move towards and away from powder bed 104 in vertical dimension 107. Accordingly, recoating device 116 is configured to displace any portion of particulates 128 on powder bed 104 in any direction in order to form build layer 112. In another embodiment, recoating device 116 is stationary and build platform 102 is configured to move relative to recoating device 116. In alternative embodiments, recoating device 116 is configured to move in any manner that facilitates the operation of additive manufacturing system 100 as described herein.

As shown in FIG. 3, recoating device 116 has displaced a portion of particulates 128. Recoating device 116 is configured to reduce undesirable disruption of particulates 128 during the recoating process. Accordingly, recoating device 116 and particulate delivery system 124 facilitate building a component 114 from particulates 128. In alternative embodiments, recoating device 116 is configured in any manner that facilitates operation of control system 200 and additive manufacturing system 100 as described herein.

In the exemplary embodiment, system controller 212 receives a build file for component 114, including a plurality of build layers 112 of component 114. In an alternative embodiment, the build file and a plurality of recoating parameters are initially input by user 184 into system controller 212. Using the build file, system controller 212 is configured to generate a plurality of recoating parameters for each of the plurality of build layers 112. As used herein, the term "parameter" refers to characteristics that are used to define the operating conditions of control system 200, such as a recoating device 116 height relative to powder bed 104, a recoating device 116 speed relative to powder bed 104, a recoating device 116 angle relative to powder bed 104, a recoating device 116 travel path across powder bed 104, and a cycle type of recoating device 116 within control system 200. The parameters represent a given operating state of control system 200. In general, during recoating of component 114, recoating device is controlled to progress fully across powder bed 104 in the direction of longitudinal axis 103 and to return to a predetermined start point to define a full recoating cycle. In alternative embodiments, system controller 212 generates any recoating parameter that facilitates control system 200 operating as described herein.

System controller 212 is further configured to receive torque output data from torque sensor 208, receive vibration data from vibration sensors 202, 204, and 206, and receive reflected light data from optical sensor 210. In the exemplary embodiment, system controller 212 receives the plurality of data and then determines at least one powder bed 104 characteristic based on the received data. In the exemplary embodiment, the powder bed 104 characteristic includes at least one of surface roughness, flatness, porosity, and surface coverage, for the upper surface of each build layer 112, and the relative position of powder bed 104 with respect to other parts of additive manufacturing system 100. The powder bed 104 characteristics of build layer 112 are dependent on the quantity and type of inconsistencies in the distribution and arrangement of particulates 128 in each build layer 112.

In the exemplary embodiment, once system controller 212 has determined at least one powder bed 104 characteristic based on the received data, system controller 212 is configured to control at least one recoating parameter of recoating device 116, based at least partially on the at least one powder bed 104 characteristic. For example, without limitation, based on data from first vibration sensor 202, second vibration sensor 204, and third vibration sensor 206, in addition to data from torque sensor 208 and optical sensor 210, system controller 212 can determine that a build layer 112 has a particular surface roughness condition. System controller 212 can update at least one of the recoating parameters to correct the surface roughness condition and then control recoating device 116 according to the updated recoating parameters. In another embodiment, system controller 212 is configured to update at least one recoating parameter of recoating device 116 in real-time, at least partially in response to the received real-time data generated during the recoating process. In another embodiment, system controller 212 is configured to update at least one recoating parameter of control system 200 in response to the position of powder bed 104 relative to recoating device 116. In alternative embodiments, system controller 212 is configured to control system 200 in any way that facilitates the operation of manufacturing system 100.

Figure 6:
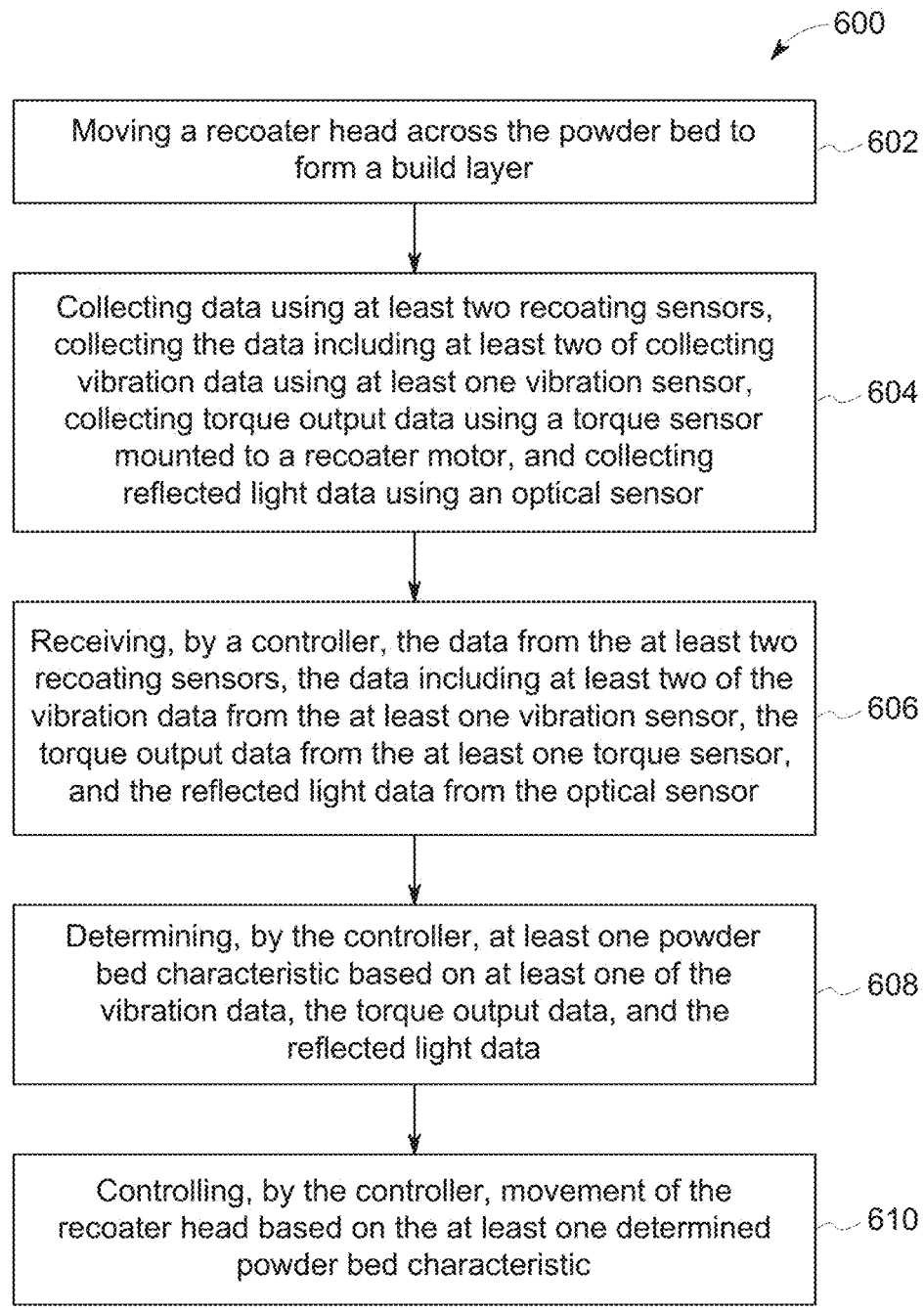
FIG. 6 is a flow diagram illustrating exemplary steps of an exemplary method of recoating a component that may be implemented using the recoating system shown in FIGS. 2-3.

FIG. 6 is a flow diagram illustrating exemplary steps of an exemplary method 600 of recoating component 114 using control system 200 (shown in FIGS. 2 and 3). Method 600 includes moving 602 recoating device 116 over powder bed 104 to form build layer 112 of component 114. Method 600 further includes collecting 604 data using at least two recoating sensors, collecting the data including at least two of collecting vibration data using first vibration sensor 202, second vibration sensor 204, and third vibration sensor 206, collecting torque output data using torque sensor 208 mounted to recoating motor 115, and collecting reflected light data using optical sensor 210 while recoating device 116 is forming build layer 112.

Method 600 further includes receiving 606, by system controller 212, the data from the at least two recoating sensors, the data comprising at least two of the vibration, torque, and reflected light data from first vibration sensor 202, second vibration sensor 204, third vibration sensor 206, torque sensor 208, and optical sensor 210. Method 600 includes determining 608 at least one powder bed characteristic using system controller 212. Finally, Method 600 includes controlling 610, by system controller 212, movement of recoating device 116 based at least partially on the at least one determined powder bed characteristic.

The methods and systems described herein provide improved recoating of components in an additive manufacturing system through monitoring and controlling the recoating process. Specifically, a recoating controller and a plurality of sensors facilitate reducing variation in the particulate distribution within a build layer of a powder bed. The controller receives real-time vibration data, torque output data, and reflected light data from a plurality of sensors and modifies a plurality of recoating parameters to facilitate reducing variation in the particulate distribution within a build layer of the powder bed. The improved particulate distribution facilitates improving consistency in component material and structural properties and leads to decreased scrap rates and recoating times. As a result, the system facilitates improved monitoring and operation of the recoating operation and provides real-time data relating to the recoating process during operation.

An exemplary technical effect of the methods and systems described herein includes at least one of: (a) providing real-time data relative to a recoating process; (b) reducing variation in a particulate distribution within a build layer of a powder bed; (c) improving consistency in component material and structural properties; (d) reducing scrap; (e) decreasing recoating times; and (f) reducing operating costs.

Exemplary embodiments of recoating methods and systems are described above in detail. The recoating methods and systems are not limited to the specific embodiments described herein, but rather, components of systems and/or steps of the methods may be utilized independently and separately from other components and/or steps described herein. For example, the methods may also be used in combination with other systems requiring recoating, and are not limited to practice with only the systems and methods as described herein. Rather the exemplary embodiment can be implemented and utilized in connection with many other applications, equipment, and systems that may benefit from an increased cutting efficiency.

Although specific features of various embodiments of the technology may be shown in some drawings and not in others, this is for convenience only. In accordance with the principles of the invention, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system for use in an additive manufacturing system including a powder bed defined by a platform, a recoating device configured to distribute powder for forming a component in the powder bed, and a recoating motor configured to move at least one of the powder bed and the recoating device relative to each other, said control system comprising:
    at least three recoating sensors, said at least three recoating sensors comprising:
        at least two vibration sensors configured to collect vibration data, wherein said at least two vibration sensors comprise at least one first vibration sensor coupled to the recoating device and at least one second vibration sensor coupled to the platform; and
        an optical sensor configured to collect reflected light data; and
    a controller configured to receive data from said at least three recoating sensors, the data comprising the vibration data from said at least two vibration sensors and the reflected light data from said optical sensor, said controller further configured to determine at least one powder bed characteristic based the vibration data and the reflected light data, and control at least one recoating parameter of the recoating device based on the at least one determined powder bed characteristic.

2. The control system in accordance with claim 1, wherein said controller is further configured to:
    receive a build file including a plurality of build layers of a component; and
    generate at least one recoating parameter for each of the plurality of build layers.

3. The control system in accordance with claim 1, wherein said at least two vibration sensors comprise at least one of a single-axis accelerometer coupled to the recoating device, a triple-axis accelerometer coupled to the recoating device, and a triple-axis accelerometer coupled to a build platform of the additive manufacturing system.

4. The control system in accordance with claim 1, wherein said optical sensor comprises at least one of a three-dimensional imaging profilometer, a two-dimensional imaging profilometer, and a spot optical displacement sensor.

5. The control system in accordance with claim 1, wherein said at least three recoating sensors further comprise a torque sensor wherein said torque sensor is coupled to the recoating motor and configured to collect torque output data, and wherein said controller is further configured to determine at least one powder bed characteristic based on the torque output data.

6. The control system in accordance with claim 1, wherein the at least one powder bed characteristic is at least one of a surface roughness, a flatness, a porosity, and a surface coverage.

7. The control system in accordance with claim 1, wherein the at least one recoating parameter is at least one of a recoating device depth, a recoating device speed, a recoating device angle relative to the powder bed, a recoating device travel path, and a recoating device cycle type.

8. The control system in accordance with claim 7, wherein said controller is further configured to update the at least one recoating parameter in real-time.

9. An additive manufacturing system comprising:
a platform comprising a powder bed;
a recoating device coupled to said platform, said recoating device configured to distribute powder for forming a build layer in said powder bed;
a recoating motor coupled to said platform and configured to move at least one of said powder bed and said recoating device relative to each other; and
a control system comprising:
at least two recoating sensors, said at least two recoating sensors comprising:
at least one vibration sensor configured to collect vibration data, wherein said at least one vibration sensor comprises at least one of a first vibration sensor coupled to said recoating device and a second vibration sensor coupled to said platform; and
an optical sensor configured to collect reflected light data; and
a controller configured to receive data from said at least two recoating sensors, the data comprising the vibration data from said at least one vibration sensor and the reflected light data from said optical sensor, said controller further configured to determine at least one powder bed characteristic based the vibration data and the reflected light data, and control at least one recoating parameter of the recoating device based on the at least one determined powder bed characteristic.

10. The additive manufacturing system of claim 9, wherein said controller is further configured to:
receive a build file including a plurality of build layers of a component; and
generate at least one recoating parameter for each of the plurality of build layers.

11. The additive manufacturing system of claim 9, wherein said at least one vibration sensor comprises at least one of a single-axis accelerometer coupled to the recoating device, a triple-axis accelerometer coupled to the recoating device, and a triple-axis accelerometer coupled to the platform of the additive manufacturing system.

12. The additive manufacturing system of claim 9, wherein said optical sensor comprises at least one of a three-dimensional imaging profilometer, a two-dimensional imaging profilometer, and a spot optical displacement sensor.

13. The additive manufacturing system of claim 9, wherein said at least two recoating sensors further comprise a torque sensor, wherein said torque sensor is coupled to the recoating motor and configured to collect torque output data, and wherein said controller is further configured to determine at least one powder bed characteristic based on the torque output data.

14. The additive manufacturing system of claim 9, wherein the at least one powder bed characteristic is at least one of a surface roughness, a flatness, a porosity, a surface coverage, and a powder bed position measurement.

15. The additive manufacturing system of claim 9, wherein the at least one recoating parameter is at least one of a recoating device height, a recoating device speed, a recoating device angle relative to the powder bed, a recoating device travel path, and a recoating device cycle type.

16. The additive manufacturing system of claim 15, wherein said controller is further configured to update the at least one recoating parameter in real-time.

17. A method for recoating a component in a powder bed defined by a platform in an additive manufacturing system, said method comprising:
moving at least one of the powder bed and a recoating device relative to each other to form a build layer; and
collecting data using at least three recoating sensors, collecting the data comprising:
collecting vibration data using at least two vibration sensors, wherein the at least two vibration sensors include at least one first vibration sensor coupled to the recoating device and at least one second vibration sensor coupled to the platform; and
collecting reflected light data using an optical sensor;
receiving, by a controller, the data from the at least three recoating sensors, the data comprising the vibration data from the at least two vibration sensors and the reflected light data from the optical sensor;
determining, by the controller, at least one powder bed characteristic based on the vibration data and the reflected light data; and
controlling, by the controller, movement of the recoating device based on the at least one determined powder bed characteristic.

18. The method in accordance with claim 17, wherein collecting vibration data comprises collecting vibration data using at least one of a single-axis accelerometer coupled to the recoating device, a triple-axis accelerometer coupled to the recoating device, and a triple-axis accelerometer coupled to a build platform of the additive manufacturing system.

19. The method in accordance with claim 17, wherein collecting reflected light data comprises collecting reflected light data using at least one of a three-dimensional imaging profilometer, a two-dimensional imaging profilometer, and a spot optical displacement sensor.

20. The method in accordance with claim 17, wherein collecting data further comprises collecting torque output data using a torque sensor coupled to a recoating motor, and wherein determining at least one powder bed characteristic further comprises determining at least one powder bed characteristic based on the torque output data.

21. The method in accordance with claim 17, wherein determining the at least one powder bed characteristic comprises determining at least one of a surface roughness, a flatness, a porosity, a surface coverage, and a powder bed position measurement.

22. The method in accordance with claim 17, further comprising updating at least one recoating parameter based on the at least one determined powder bed characteristic, wherein the at least one recoating parameter is one of a recoating device depth, a recoating device speed, a recoating device angle relative to the powder bed, and a recoating device travel path.

23. The method in accordance with claim 22, wherein updating the at least one recoating parameter comprises updating the at least one recoating parameter in real-time.

* * * * *